United States Patent [19]
Bowlsbey

[11] Patent Number: 5,639,369
[45] Date of Patent: Jun. 17, 1997

[54] FILTER ELEMENT

[75] Inventor: John R. Bowlsbey, Elkton, Md.

[73] Assignee: W. L. Gore & Associates, Inc., Newark, Del.

[21] Appl. No.: 679,022

[22] Filed: Jul. 12, 1996

Related U.S. Application Data

[63] Continuation-in-part of Ser. No. 502,412, Jul. 14, 1995, abandoned.

[51] Int. Cl.$^6$ .................................................. B01D 29/70
[52] U.S. Cl. ............... 210/323.2; 210/346; 210/486; 210/487; 210/494.1; 210/497.01; 210/497.2
[58] Field of Search ........................... 210/323.2, 346, 210/486, 487, 494.1, 497.01, 497.2

[56] References Cited

U.S. PATENT DOCUMENTS

| | | |
|---|---|---|
| 3,107,217 | 10/1963 | Muller . |
| 3,190,449 | 6/1965 | Muller . |
| 3,206,178 | 9/1965 | Lamb . |
| 3,233,734 | 2/1966 | Muller . |
| 3,251,468 | 5/1966 | Muller . |
| 3,291,310 | 12/1966 | Marvel ............................. 210/356 |
| 3,326,382 | 6/1967 | Bozek et al. . |
| 3,356,219 | 12/1967 | Muller . |
| 3,395,801 | 8/1968 | Muller . |
| 3,448,862 | 6/1969 | Kudlaty . |
| 3,556,304 | 1/1971 | Collard et al. . |
| 3,633,753 | 1/1972 | Petitjean ............................. 210/356 |
| 3,695,443 | 10/1972 | Schmidt, Jr. ..................... 210/497.01 |
| 3,712,471 | 1/1973 | Muller . |
| 3,948,778 | 4/1976 | Muller . |
| 3,953,566 | 4/1976 | Gore ................................. 264/288 |
| 4,032,688 | 6/1977 | Pall ................................... 210/494.1 |
| 4,057,501 | 11/1977 | Muller . |
| 4,069,103 | 1/1978 | Muller . |
| 4,104,169 | 8/1978 | Muller et al. . |
| 4,116,738 | 9/1978 | Pall . |
| 4,152,261 | 5/1979 | Muller . |
| 4,156,630 | 5/1979 | Muller . |
| 4,163,724 | 8/1979 | Muller et al. . |
| 4,167,482 | 9/1979 | Muller . |
| 4,213,861 | 7/1980 | Muller et al. . |
| 4,219,420 | 8/1980 | Muller . |
| 4,224,153 | 9/1980 | Muller . |
| 4,225,441 | 9/1980 | Muller . |
| 4,230,576 | 10/1980 | Muller et al. . |
| 4,239,830 | 12/1980 | Ball . |
| 4,276,166 | 6/1981 | Muller et al. . |
| 4,404,106 | 9/1983 | Muller et al. . |
| 4,443,346 | 4/1984 | Muller . |
| 4,446,030 | 5/1984 | Schmidt, Jr. . |
| 4,473,472 | 9/1984 | Muller . |
| 4,488,965 | 12/1984 | Muller et al. . |
| 4,500,435 | 2/1985 | Muller . |
| 4,511,471 | 4/1985 | Muller . |
| 4,526,688 | 7/1985 | Schmidt, Jr. et al. ............... 210/323.2 |
| 4,578,197 | 3/1986 | Muller . |
| 4,591,446 | 5/1986 | Muller . |
| 4,604,201 | 8/1986 | Muller . |
| 4,650,580 | 3/1987 | Schumacher . |
| 4,732,687 | 3/1988 | Muller et al. . |
| 4,820,469 | 4/1989 | Walsh et al. . |
| 4,874,514 | 10/1989 | Casey, Jr. ........................... 210/323.2 |

FOREIGN PATENT DOCUMENTS

| | | |
|---|---|---|
| 1197473 | 3/1985 | Canada . |
| 1207260 | 7/1986 | Canada . |
| 0073079 | 2/1983 | European Pat. Off. . |
| 2303580 | 10/1975 | France . |
| 2659123 | 6/1978 | Germany . |
| 658405 | 11/1986 | Switzerland . |
| 660224 | 3/1987 | Switzerland . |
| 660851 | 5/1987 | Switzerland . |
| 8303364 | 10/1983 | WIPO . |

OTHER PUBLICATIONS

Literature: "General Specification for NSW Filtration Products", NSW Corporation; No date.

*Primary Examiner*—W. L. Walker
*Attorney, Agent, or Firm*—Victor M. Genco, Jr.

[57] ABSTRACT

A support element is provided for a tubular filter device having an oversized filter sock. The support element provides relief portions within which excess filter media of the filter sock enters, during use of the tubular filter device, to eliminate detrimental wrinkling and compaction of the filter media.

5 Claims, 5 Drawing Sheets

FILTER ELEMENT

This application is a continuation-in-part of application Ser. No. 08/502,412 filed Jul. 14, 1995, which is now abandoned.

FIELD OF THE INVENTION

The present invention relates to industrial filter elements, and especially to tubular or "candle" filter devices.

BACKGROUND OF THE INVENTION

It is common today to employ tubular filters in a variety of industrial filtering applications. For example, such tubular filters may be employed in mine water draw down procedures during which arsenic and other hazardous materials are filtered out of waste water originating from gold mining operations. Tubular filters also may be employed in waste water pretreatment facilities to filter hazardous materials, such as chromium for example, from industrial waste water.

Tubular filters generally comprise a cylindrical sock of filtration media which is slid over an inner perforated support tube. When a pressure differential is established across the filter, fluid flows through the filtration media and filtrate is removed. In order to prevent by-passing of unfiltered fluid around the sock, it is important that the ends of the sock are tightly sealed to the ends of the tube to avoid leakage of solids through the ends of the sock.

A major improvement in the field of filter media has been the development of expanded polytetrafluoroethylene (PTFE) membrane products. Such membrane products can be produced in a known manner, such as in accordance with the teachings of U.S. Pat. No. 3,953,566, which is incorporated herein by reference. This expanded PTFE comprises a microporous structure, defined by a matrix of nodules interconnected by fibrils, which can be adapted to provide specific filtration properties in many different forms. Socks for tubular filters are commercially available from W. L. Gore & Associates, Inc., Elkton, Md., under the trademark GORE-TEX® Membrane Tubular Filter Socks. These products comprise an expanded PTFE membrane attached to a felt-like material ranging in many thicknesses, such as but not limited to, thicknesses ranging from about 0.75 to about 2.5 mm. For certain applications, this material may comprise a composite, with additional layers applied to the filtration media for improved durability or better filtration.

Because of the relative inelasticity of most filter media, and in particular filter media comprised at least in part of expanded PTFE, in order for a sock to be positioned over a sock support element, socks for tubular support elements must be dimensioned slightly larger than the outer diametral dimension of a sock support element. However, during use, pressure is applied on the exterior surface of the filter sock, or a vacuum pulls an interior surface of the filter sock, which causes the excess material of the oversized filter sock to detrimentally wrinkle. Such wrinkling compacts the pores of the membrane, which reduces the filtering effectiveness of the filter sock. Additionally, this wrinkling causes premature failure of the filter media.

The foregoing illustrates limitations known to exist in present tubular filter devices. Thus, it is apparent that it would be advantageous to provide an improved tubular support element directed to overcoming one or more of the limitations set forth above. Accordingly, a suitable alternative is provided including features more fully disclosed hereinafter.

SUMMARY OF THE INVENTION

In one embodiment of the present invention, an improved filter element is provided comprising an extruded plastic tubular support element and a filter sock. The tubular support element is defined by a hollow main body having an interior surface portion, an exterior surface portion and a plurality of perforations formed therethrough. The interior surface portion and the exterior surface portion define a main body wall thickness. The main body has a plurality of ribs formed integrally with the main body. The ribs extend substantially perpendicularly outwardly from the main body and substantially longitudinally along the length of the main body. The main body defines first and second exterior circumferences. The first exterior circumference is defined by the wall portion of the main body, and the second exterior circumference is defined by the outwardly extending ribs. The main body includes at least one relief portion between adjacent ribs and between the first and second exterior circumferences. The filter sock is defined by a filter which may be media suitable for liquid filtration. The filter sock is oversized relative to the second exterior circumference. The relief portion provides a volume within which excess filter media of the oversized filter sock enters, during use of the improved filter element, to eliminate detrimental wrinkling and compaction of the filter media.

BRIEF DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF THE INVENTION

Figure 1:
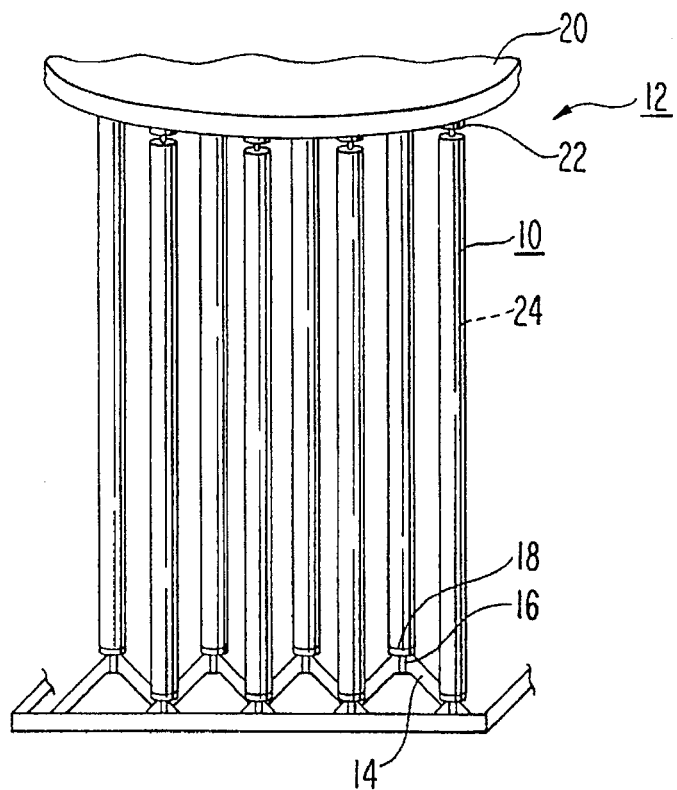
FIG. 1 is a conventional filtration assembly comprising the improved tubular support element of the present invention.

Referring now to the drawings, wherein similar reference characters designate corresponding parts throughout the several views, the present invention is directed to an improved tubular support element having a filter sock. As used herein, the term "filter sock" is intended to include any form of a substantially non-elastic filter sock tubular or similarly formed filtration media, such as a tube filter slid over a perforated tubular support element in a liquid filtration element.

FIG. 1 shows a series of tubular filter elements 10 of the present invention mounted in a rack of a filtration apparatus 12. The lower portion of the filtration apparatus 12 comprises a bottom separation grid 14 having a series of mounting elements 16 into which end caps 18 of the tubular filter element 10 attach. The upper portion of the liquid filtration apparatus 12 comprises an upper tube sheet or manifold 20 having a series of fittings 22, each forming a fluid connection between a perforated tubular support element 24 mounted within the tubular filter element 10 and fluid conduits (not shown).

Filtration apparatus 12, of the type shown in FIG. 1, are commonly employed within industrial filters, such as those used for filtering fresh and salt water, waste liquids, liquid food products (e.g. sugar solutions or oils) or intermediates, and various chemical products or intermediates. It should be understood that the present invention is not limited to interface with the illustrated element and may be adapted for use in many other liquid filter applications.

Figure 2:
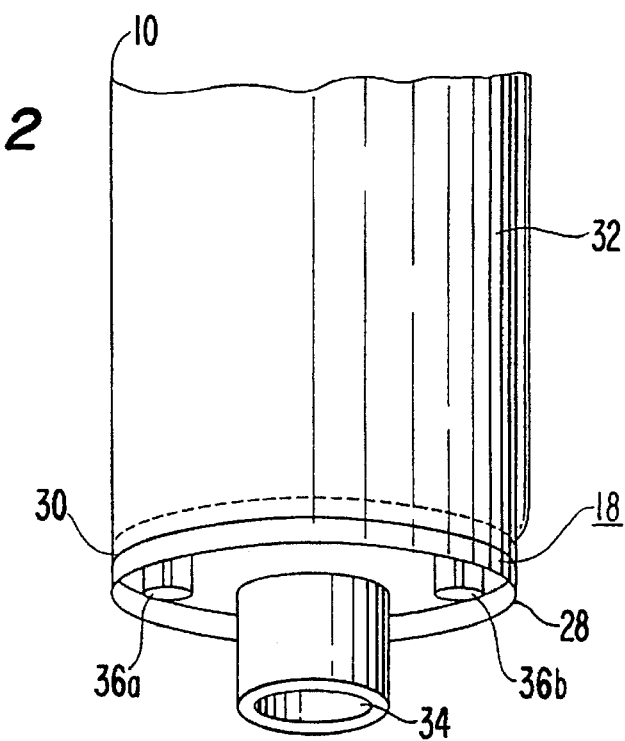
FIG. 2 is a partial view of the tubular support element of the present invention.
Figure 3:
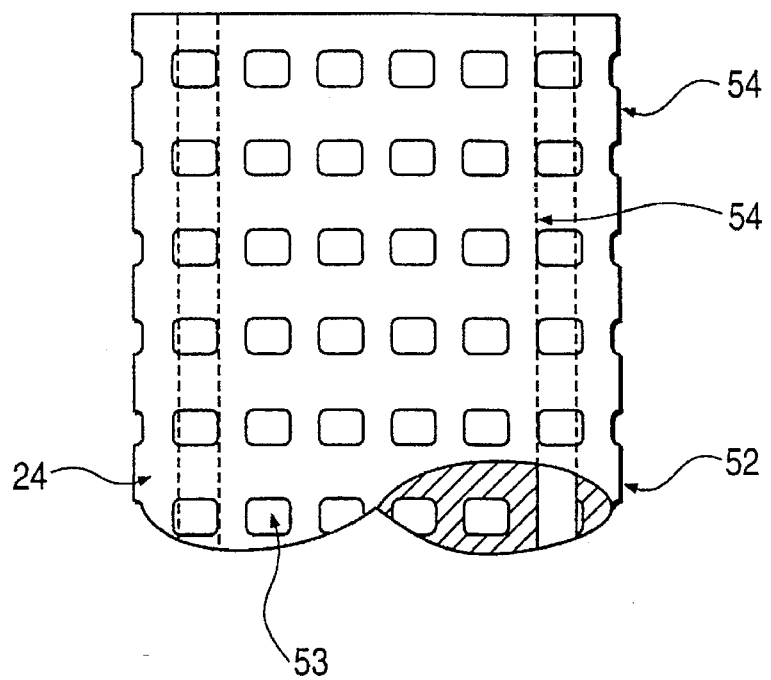
FIG. 3 is a partial view of a tubular support element in accordance with the teachings of the present invention.
Figure 4:
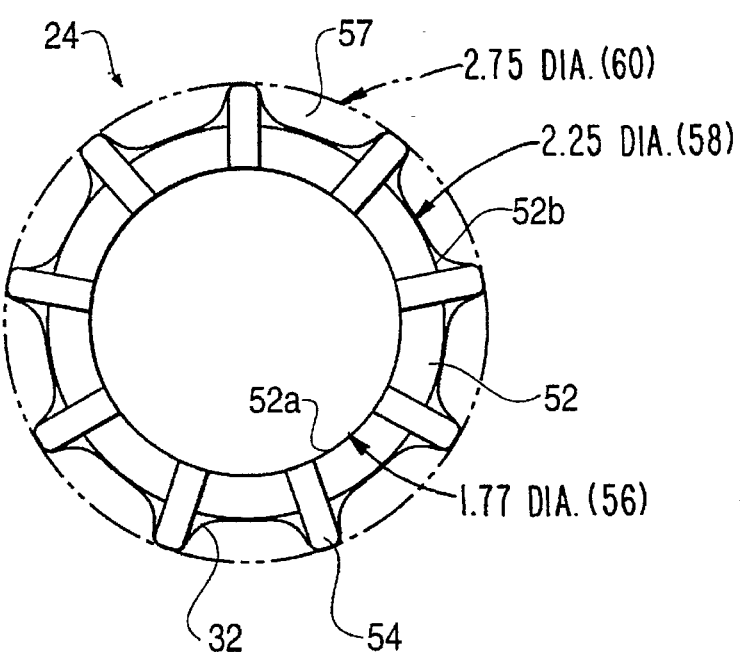
FIG. 4 is an end view of an embodiment of the tubular support element of FIG. 3.

FIG. 2 is a view of an end of the tubular filter element 10. An end cap 18 defines a circumferential ring 28 which is adapted to fit within a first end 30 of a filter sock 32. The end cap may be constructed from any suitable material appropriate for use with a given application. For most applications, the end cap may be constructed from any one of the following: polypropylene, polyester, polystyrene, polyvinylchloride (PVC), polyvinylidene fluoride (PVDF), fluorinated ethylenepropylene (FEP), acrylonitrile butadiene styrene (ABS), or any compatible thermoplastic.

For many filtration applications, the preferred filtration media of the filter sock 32 comprises a composite of felt (e.g., polytetrafluoroethylene (PTFE), expanded PTFE, propylene, or similar support felt or other fabric material) laminated to a microporous membrane (e.g., expanded PTFE film). Suitable material of this type is commercially available from W. L. Gore & Associates, Inc., Elkton, Md., under the trademark GORE-TEX® Membrane Tubular Filter Socks. This material may be produced in the form of a continuous tube or may be wrapped into a cylinder and sealed.

Ring 28 is bonded to the filter sock 32 by a process that does not damage the filtration media. The bonding process should resist passage of fluid both between the cap 18 and the filter sock 32, and longitudinally through the filtration media itself in the area of the cap 18. This bonding process may comprise a variety of adhesives (e.g. epoxy, glues, etc.) melting or other welding procedures, impulse heat sealing ("hot wire"), hot probes, hot gas, adhesive tapes, etc.

A very effective seal can be formed between a filter media of expanded PTFE and an end cap 18 of polypropylene or similar thermoplastic material through a sonic weld. This procedure is performed by using a sonic weld apparatus, such as a Series 900 Sonic Welder available from Branson Ultrasonics Corporation, Danbury, Conn. A semi-circular "horn" is used to match the contour of the end cap 18 and a weld is established by placing the horn in tight contact with the sock and cap and applying sonic energy. Typical conditions required to produce a suitable densification and seal between a sock of laminated felt/expanded PTFE membrane filtration media and a polypropylene cap comprise applying about 1000 watts of energy and about 20 to 40 kg of force for approximately 600 milliseconds.

The sonic weld produces a particularly effective bond by first, creating a tight seal between the cap 18 and the filter sock 32, and second by forming a densified seam around the periphery of the filter sock. The densified seam prevents fluid from seeping through the interstices of the filtration media, and the risk of filter compromise inherent with such seepage.

Other forms of bonds which may be employed include ones created through fusion welding, such as through the use of electromagnetic field fusion welding (e.g. the EMAWELD Process available from Emabond Systems, Specialty Polymers & Adhesives, Ashland Chemicals, Inc., Norwood, N.J. (melting plastic and metal particles)), hot wire welding processes, "hot jaws" processes, hot air, etc.

The end cap 18 may include a series of receptacles therein to permit ready interface with the filtration apparatus 12. For use with many conventional filtration systems, the end cap may include a center socket 34 and multiple "spanner holes" or apertures 36a, 36b. This construction is particularly suitable for use with available filtration apparatus such as a Type 114G HYDRA-SHOC® Tube Filter manufactured by Industrial Filter & Pump Mfg. Co., Cicero, Ill.

A typical filtration apparatus 12 includes mounting elements 16 into which the perforated tubular support elements 24 attach. The end cap 18 of the present invention is designed to fit between the mounting element 16 and a respective tubular support 24. The tubular support element 24 is slid within a filter sock 32 to provide a filter element.

It should be evident from the above description that the present invention can be adapted for use with a variety of different filtration elements merely by supplying suitable end caps complementing various mounting configurations. Examples of other common mounting configurations include rectangular, hexagonal, oval, or other geometric shaped hubs and sockets, etc.

The opposite end of the filter sock 32 must likewise be sealed to the filtration element. Even though conventional sealing techniques such as clamps or cords for attaching this end are generally acceptable for most filter media, it is believed that faster and more reliable seals may be used in conjunction with the present invention. This may be particularly important with the use of a laminated felt/expanded PTFE composite sock filter. One such technique is illustrated in FIGS. 5a through 5d.

Figure 5A:
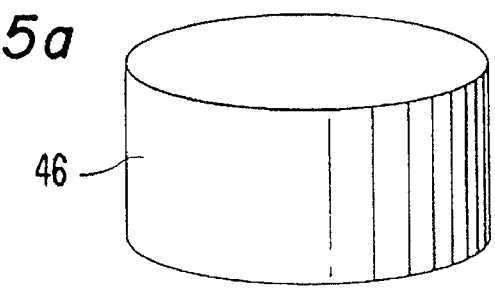
FIGS. 5a–d illustrate a method of sealing an end of a tubular support element of the present invention.
Figure 5B:
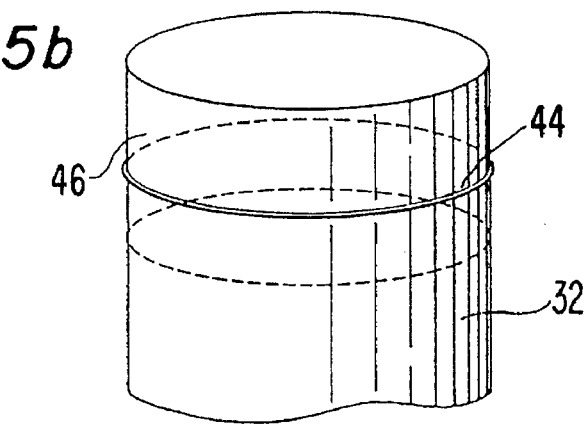
Figure 5C:
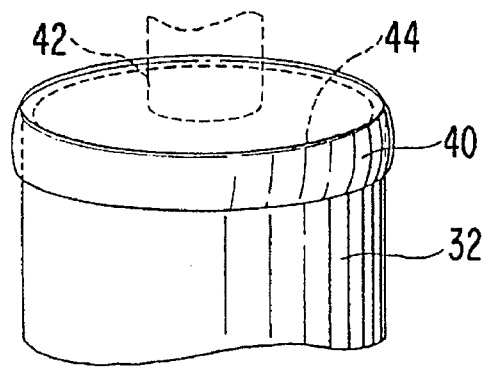
Figure 5D:
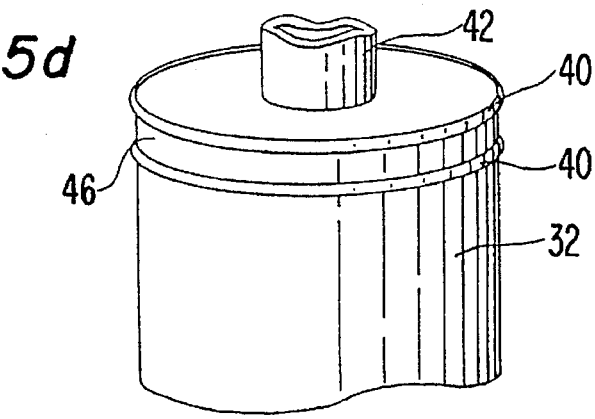
Figure 6:
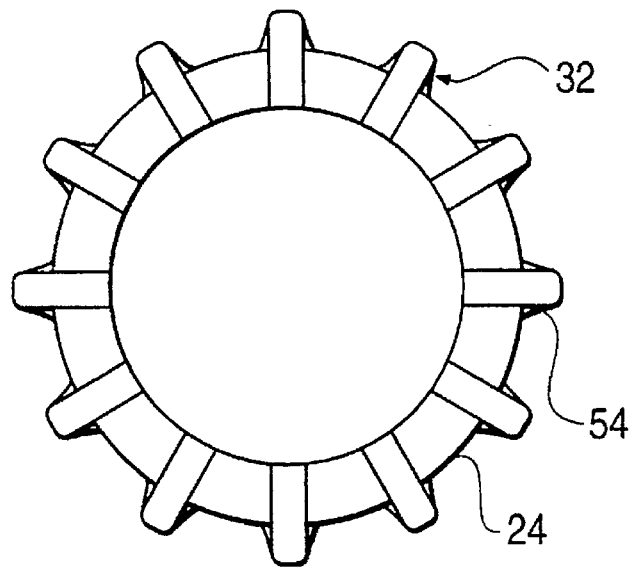
FIG. 6 is an end view of an embodiment of the tubular support element of FIG. 3.

The effective sealing of the second end uses an elastic band 40. The band 40 is proportioned to fit precisely around a fitting 42 and within an end 44 of a filter sock 32 (i.e., positioned between filter sock 32 and the fitting 42). The band 40 should be flexible enough to be doubled over the end 44 and enwrap the outside of the filter sock 32, as is shown in FIGS. 5b and 5c. In this manner, fitting 42 is snugly installed within the enwrapped end 44 of the filter sock 32 and retained in place therein with a strap 46, such as a clamp, cord, wire, band, or other retention means. The advantage of this mounting method is that the filtration media is isolated from the clamping element, avoiding damage that flexing and friction generated between the filtration media and the clamp can cause. Additionally, the terminus of the end 44 is completely sealed from exposure to slurry, thus assuring that leakage does not occur longitudinally along the interstices of the filter sock 32.

This sealing method is quite effective and should be useful for all kinds of applicable filtration environments. It should be noted that for some applications this sealing technique may also be effective on the lower end or both ends of the tube filter. For all applications, the type of elastic band 40 and retention means 46 chosen to secure the band 40 are application specific. For most applications, the following materials may be appropriate, for the elastic band 40: natural rubber, ethylene-propylene diene monomer (EPDM), CALREZ, silicone, neoprene, Bunan, urethane, etc.; for the strap 46: metal (e.g., stainless steel, alloy), nylon, polypropylene, etc.

As described hereinabove, because of the relative inelasticity of most filter media, and in particular filter media comprised at least in part of expanded PTFE, in order for a filter sock 32 to be positioned over a tubular support element, such a filter sock must be dimensioned slightly larger than the outer diametral dimension of a sock support element. However, during use, pressure is applied on an exterior surface of these filter socks, or a vacuum pulls an interior surface of these filter socks, which causes the excess material of such filter socks to detrimentally wrinkle. Such wrinkling compacts the pores of the membrane thereby reducing the filtering effectiveness of the filter sock. Additionally, this wrinkling causes premature failure of the filter media. To overcome such deficiencies, a tubular support element of the type illustrated in FIG. 7 has heretofore been employed. This prior art tubular support element has operated with varying degrees of success, but, as described in detail hereinafter, suffers from a multiplicity of shortcomings which have detracted from its usefulness,.

Figure 7:
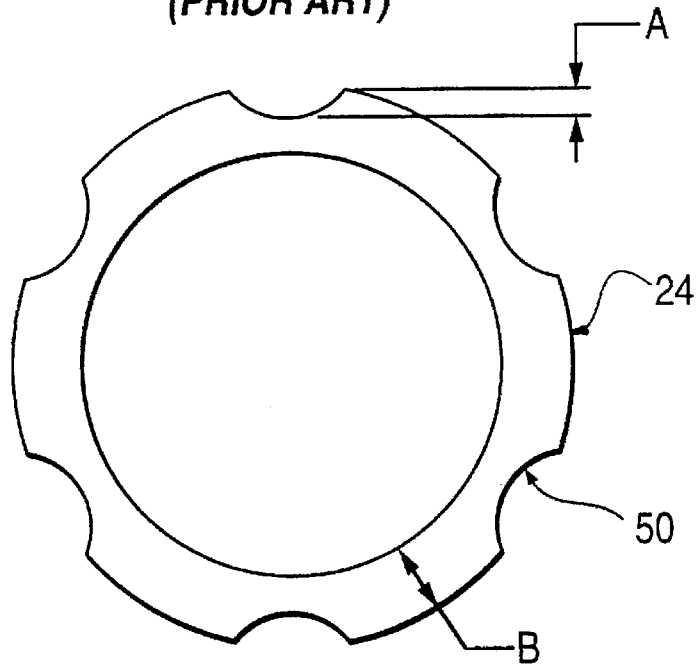
FIG. 7 is an end view of a prior art tubular support element.
Figure 8:
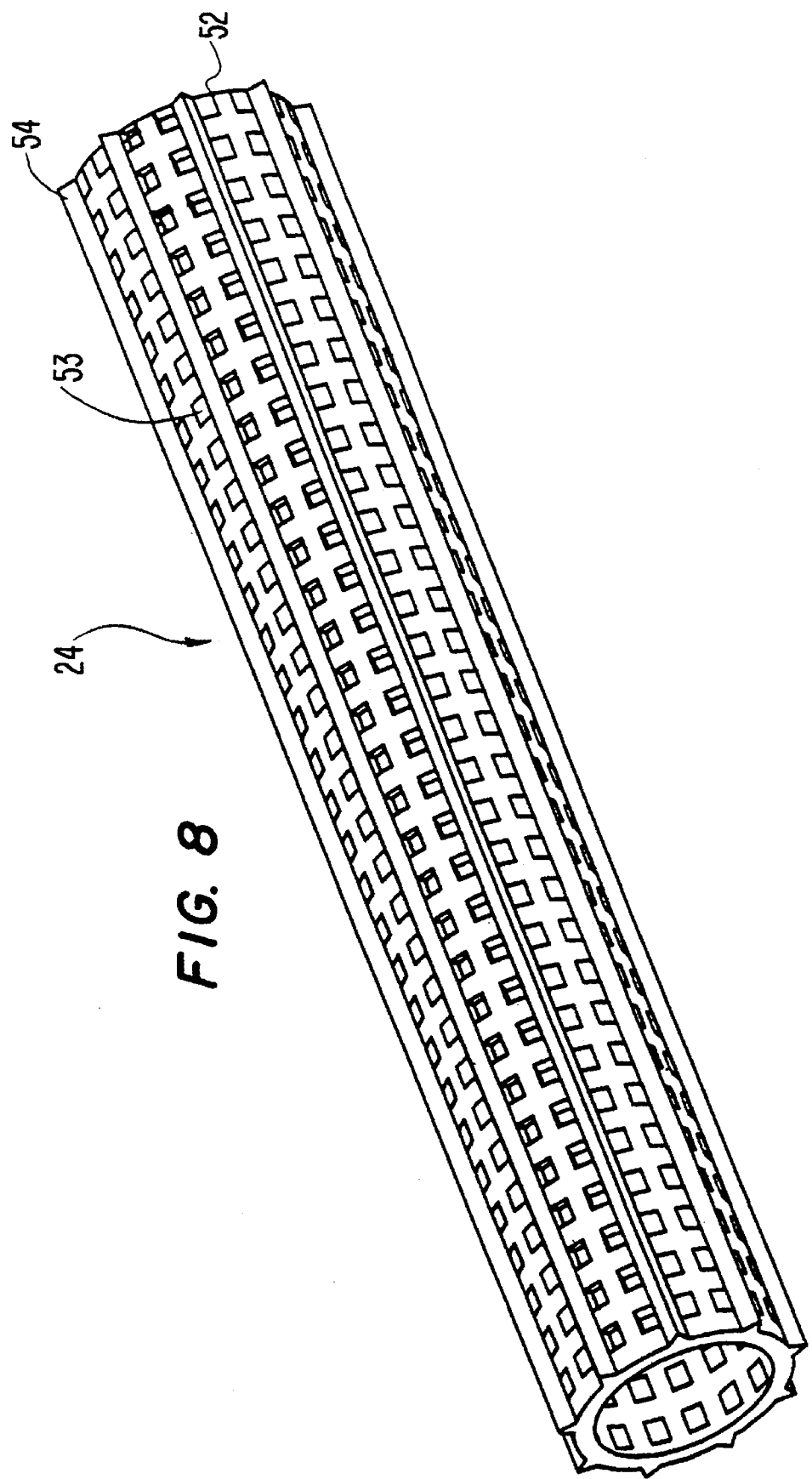
FIG. 8 is a perspective view of the tubular support element of the present invention.

The prior art tubular support element 24 of FIG. 7 is formed from a suitable material, such as polyethylene for example. This tubular support element is first manufactured as a thick cylindrical sock through which a plurality of apertures (not shown) are machined, which thereby render the tube substantially perforated. Thereafter, grooves 50 are machined substantially longitudinally along the length of the tubular support element. The grooves 50 function as a relief volume into which excess material of an oversized filter sock may enter during use. In this regard, because the excess filter is provided a volume within which to enter, wrinkling and compaction of the material is minimized. However, and as may be appreciated by one skilled in the art, the machining of the tubular support element removes a substantial amount of the raw material used to make the support element in the first instance. Such a manufacturing process is both costly and wasteful. Additionally, the dimension of the relief volume of these prior art tubular support elements is limited. In this regard, a depth "A" of any relief volume formed by the grooves 50 can not be greater than the total thickness "B" of the cylindrical sock. Accordingly, because of the dimensional limitations of the individual relief volumes of these prior art tubular support elements, such support elements have not been completely effective in eliminating detrimental wrinkling and compaction of the filter media which occurs during use of an oversized filter sock.

FIGS. 3, 4, 6 and 8 illustrate the novel tubular support element 24 of the present invention. The tubular support element is defined by an extruded, substantially cylindrical main body 52 having an interior surface portion 52a, an exterior surface portion 52b and a plurality of perforations 53 formed therethrough. The interior surface portion and the exterior surface portion define a main body cylindrical wall portion having a predetermined thickness. A plurality of ribs 54 are formed integrally with the main body 52. The ribs extend substantially longitudinally along the length of the tubular support element. The main body 52 includes an interior circumference defined by diameter 56, a first exterior circumference defined by diameter 58, and a second exterior circumference defined by diameter 60. The ribs 54 extend substantially outwardly from the main body 52 to define the second exterior circumference. A relief portion 57 is formed between adjacent ribs 54 in the region which is defined between the first and second exterior circumferences. Each relief portion 57 provides a volume within which the excess filter media enters to thereby eliminate detrimental wrinkling and compaction of the media.

The tubular support element of the present invention is formed as an integral assembly by an extrusion process, in an economical fashion, as compared with the costly and wasteful process of the prior art. The tubular support element 24 may be comprised of any suitable material such as, but not limited to, low density polyethylene (LDPE), high density polyethylene (HDPE), polypropylene, or other resins. The main body 52 is substantially non-resiliently radially deformable. Accordingly, diameter 60 remains substantially constant both during periods of filtration operations and during periods of non-use. The tubular support element 24 is able to withstand a compressive pressure of at least 30 pound per square inch (PSI) without collapsably deforming. A suitable tubular support element 24 may be obtained from NSW Filtration Products, Corp., of Roanoke, Va.

The ribs 54 extend generally perpendicularly outwardly from the exterior surface portion 52b, therefore, the size of the relief portion 57 is not limited by the total thickness of the wall portion of the tubular support element. The ribs 54 should extend outwardly to a predetermined height which is sufficient to define a relief portion 57 which accommodates all of the excess filter media of an oversized sock in a non-wrinkling and non-compacting fashion. One tubular support element which has operated with success is defined by a main body 52 having a second exterior circumference (formed by the outwardly extending ribs 54) which is at least 120% the size of the first exterior circumference.

Although a few exemplary embodiments of the present invention have been described in detail above, those skilled in the art readily appreciate that many modifications are possible without materially departing from the novel teachings and advantages which are described herein. Accordingly, all such modifications are intended to be included within the scope of the present invention, as defined by the following claims.

Having described the invention, what is claimed is:

1. A filter element comprising:
   a tubular support element having a substantially non-resiliently radially deformable hollow main body defined by an interior surface portion, an exterior surface portion and a plurality of perforations formed therethrough, the interior surface portion and the exterior surface portion defining a main body wall having a predetermined thickness, the main body having a plurality of ribs formed integrally with the main body and extending substantially perpendicularly outwardly from the main body and substantially longitudinally along the length of the main body, the main body defining first and second exterior circumferences, the first exterior circumference being defined by the exterior surface portion of the wall of the main body, and the second exterior circumference being defined by the outwardly extending ribs, the main body defining at least one relief portion between adjacent ribs and between the first and second exterior circumferences; and a filter sock defined by a predetermined substantially non-elastic filter media, the filter sock being oversized relative to the second exterior circumference;

wherein the tubular support element is capable of withstanding a compressive pressure of at least 30 pounds per square inch without collapsably radially deforming; and wherein the relief portion provides a volume within which excess filter media of the oversized filter sock enters, during use of the element, to eliminate detrimental wrinkling and compaction of the filter media.

2. The filter element of claim 1, wherein the ribs extend outwardly to define a second exterior circumference which is at least 120% the first exterior circumference.

3. The filter element of claim 1, wherein the filter sock comprises a composite including expanded polytetrafluoroethylene therein.

4. The filter element of claim 1, wherein filter sock comprises a filtration media of expanded polytetrafluoroethylene attached to a fabric support material.

5. The filter element of claim 1, wherein the filter media is suitable for liquid filtration.

* * * * *